Patented Sept. 27, 1932

1,879,533

UNITED STATES PATENT OFFICE

HANS SCHMIDT, OF WUPPERTAL-VOHWINKEL, GERMANY, ASSIGNOR TO WINTHROP CHEMICAL COMPANY, INC., OF NEW YORK, N. Y., A CORPORATION OF NEW YORK

CALCIUM COMPLEX SALTS

No Drawing. Application filed February 27, 1931, Serial No. 518,913, and in Germany March 7, 1930.

The present invention relates to new calcium complex salts of ortho-dihydroxy benzene disulfonic acids and to a process of preparing the same.

Processes for the production of complex salts of calcium with the sulfonic acids of pyrocatechol and pyrogallol are known. Such complex salts are obtainable by the action of calcium oxide or calcium hydroxide on the salts of the said sulfonic acids with alkalies or amines.

In accordance with my present invention new calcium complex salts of the disulfonic acids of ortho-dihydroxy benzenes of the probable formula:

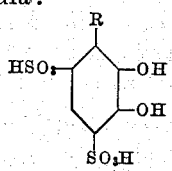

wherein R stands for hydrogen or hydroxyl, are obtainable by reacting upon 2 mols of the alkali metal salts of the above said acids with one gram atom of calcium in its salt form and one gram atom of calcium in its hydroxide form. Thereby probably a reaction takes place, for example, according to the following equation:

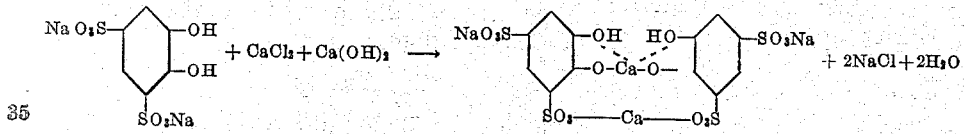

From the structural formula of the reaction product which is believed to be a suitable term to explain the properties of the new products it results that in the reaction two molecules of the ortho-dihydroxy-benzene-disulfonic acid are connected by two calcium atoms, the one of which is bound to one hydroxy group and the other to one sulfonic acid group of each of the two ortho-dihydroxy-benezene-disulfonic acid molecules. Probably the calcium linked to the hydroxy groups is furthermore connected to the free hydroxy groups by partial valences as indicated in the above formula. It may be understood that apparently the new complex compounds exist in a polymolecular state.

The process of manufacture of my new calcium complex salts may be performed by causing two mols of an alkali-ortho-dihydroxy-benzene-disulfonate in an aqueous solution to react with two mols of a water soluble calcium salt, such as the calcium halides, calcium nitrate, calcium acetate and the like, and neutralizing the mixture by the addition of a caustic alkali, in this manner transforming one mol of the calcium salt added to calcium hydroxide. It may be mentioned that, of course, the reaction performs in an analogous manner when employing as reacting components one mol of the watersoluble calcium salt and one mol of calcium hydroxide directly. Furthermore, the same result is attained when the solution of two mols of the alkali-ortho-dihydroxy-disulfonate is mixed with an acid and then neutralized with about two mols of calcium hydroxide. In this case a salt of the calcium with the acid added is primarily formed with the result that practically the same effect is produced as above, whereby upon two mols of the sulfonic acid salt one gram atom of calcium in its salt form and one gram atom of calcium in its hydroxide form enter into the reaction.

As regards the proportion of the components it is not essential to adhere strictly to equivalent quantities for example, a relatively small excess of calcium chloride is not objectionable. Moreover, in the neutralization the reaction may incline to the weak acid or to the weak alkaline side. The salts formed can be separated, for example, by the addition of watersoluble organic solvents, such as methyl and ethyl alcohol or acetone, and are with advantage dried in the air.

In this manner preferably the sodium- and potassium salts of pyrocatechin- and pyrogallol disulfonic acid have been transformed into the new calcium complex salts.

The new products differ from the hitherto known complex salts of the sulfonic acids specified and in particular differ in composition from those obtainable by the action of calcium hydroxide on the said sulfonic acids. The latter process yields, for example, from the sodium salt of pyrocatechol disulfonic acid a product containing one gram atom of calcium to two gram molecules of sodium pyrocatechol disulfonate, one gram atom of calcium being present to four gram atoms of sodium.

On the other hand the new process yields, for example, when sodium pyrocatechol disulfonate is used a product containing one gram atom of calcium to one gram molecule of sodium pyrocatechol disulfonate. Moreover, (and this is surprising and new) one of the sodium atoms combined with the sulfonic acid residue and extraordinarily firmly bound as against other influences, is replaced by one equivalent of calcium while the other equivalent of the calcium is evidently combined with the hydroxy group.

An approximately 12% aqueous solution of the calcium complex salt of sodium pyrocatechin disulfonate, the empirical composition of which is $C_6H_3O_8S_2NaCa+3-4H_2O$, is approximately isotonic to tissue, this fact indicating a high molecular weight. Apparently, therefore, a polymer of the compound represented by the empirical formula is produced as above stated. Consequently isotonic injection solutions of a high calcium content become available, which makes the new products particularly suitable for the medicinal application of the new salts.

As compared with other calcium compounds of the said complex forming substances the calcium salt of pyrocatechol disulfonic acid, for example, is distinguished by high calcium content combined with non-irritant properties when injected.

The following examples illustrate the invention without restricting it thereto.

*Example 1*

33 grams of sodium pyrocatechol disulfonate are covered with 90 ccs. of water, 23 grams of crystallized calcium chloride are added and 2 normal-caustic soda (about 46 ccs.) is then added with stirring until the reaction is nearly neutral. The resulting solution is stirred into 1200 ccs. of methyl alcohol. On standing the complex salt formed separates out, which process can be accelerated by stirring. It is filtered by suction, freed, for example by washing with advantageously about 80-90% methyl alcohol from the mother liquor containing sodium chloride and dried in the air.

In particulars alterations may be performed, for example, from the above reaction mixture the complex compound formed may be separated off by adding 650 ccs. of methyl alcohol, allowing to crystallize with stirring, adding again after some hours a small amount of methyl alcohol, separating off the precipitated complex salt, washing out the precipitate with 80% methyl alcohol and drying in the air.

A whitish powder is thus obtained, which dissolves readily in water. The yield amounts to about 35 grams. The analysis gives approximately the following values: 10.3% Ca; 5.8% Na; 15% $H_2O$ (at 180° C.). The solution has a pH value of slightly more than 7.

In the above method of working the use of, for example, 48, 50 or 52 ccs. of caustic soda lye for neutralizing has likewise given good results; likewise an excess of calcium chloride can be taken without effecting a remarkable alteration of the composition of the complex compound.

*Example 2*

31.4 grams of sodium pyrocatechol disulfonate are covered with 60 ccs. of water and 20 ccs. of 5 normal-hydrochloric acid and neutralized while stirring with 1.5 normal-milk of lime.

The solution is worked up as in Example 1 and a product of the same composition and properties is obtained.

*Example 3*

33 grams of sodium pyrocatechol disulfonate are covered with 125 ccs. of water and 12.5 grams of calcium chloride are added. The solution is neutralized while stirring with 1.5-normal milk of lime (about 57 ccs.).

The solution is worked up as in Example 1 and a product is obtained of the same composition and properties.

More milk of lime, for example 60 or 65 ccs. can likewise be used. Moreover it is not imperative to adhere strictly to this sequence of the additions.

*Example 4*

33 grams of sodium pyrocatechol disulfonate are dissolved in 150 ccs. of water and 12.5 grams of calcium nitrate are added to the solution. 1.5 normal-milk of lime is then added until the neutral point is nearly reached. The solution is stirred into 1200 ccs. of methyl alcohol and worked up as in Example 1, when a product is obtained of the same composition and properties.

*Example 5*

To a solution of 33 grams of sodium pyrogallol disulfonate in 55 ccs. of water 20 ccs. of 5 normal-hydrochloric acid are added and the solution is then neutralized while stirring with 1.5 normal-milk of lime. Thereafter it is stirred into 1200 ccs. of methyl alcohol and worked up as in Example 1. A yellowish powder is obtained, the aqueous solution of which tends to turn violet in the air. It contains about 10% of calcium and about 5.8% of sodium, that is to say the two elements in the ratio of 1:1 gram atom.

I claim:—

1. The process which comprises reacting upon 2 mols of a compound of the probable formula:—

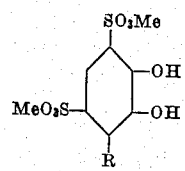

wherein R stands for a substituent of the group consisting of hydrogen and hydroxyl and Me stands for an alkali metal, with about 1 gram atom of calcium in its salt form in an aqueous solution and adding about 1 gram atom of calcium in its hydroxide form to render the mixture about neutral.

2. The process which comprises reacting upon 2 mols of a compound of the probable formula:—

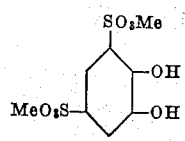

wherein Me stands for an alkali metal, with about 1 gram atom of calcium in its salt form in an aqueous solution and adding about 1 gram atom of calcium in its hydroxide form to render the mixture about neutral.

3. The process which comprises reacting upon 2 mols of a compound of the probable formula:—

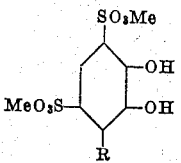

wherein R stands for a substituent of the group consisting of hydrogen and hydroxyl and Me stands for an alkali metal, with about 2 mols of a watersoluble calcium salt in an aqueous solution and adding about 2 mols of an aqueous caustic alkali solution to render the mixture about neutral.

4. The process which comprises reacting upon 2 mols of a compound of the probable formula:—

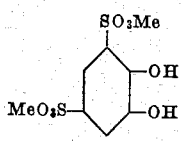

wherein Me stands for an alkali metal, with about 2 mols of a watersoluble calcium salt in an aqueous solution and adding about 2 mols of an aqueous caustic alkali solution to render the mixture about neutral.

5. The process which comprises reacting upon 2 mols of sodium pyrocatechin disulfonate with about 2 mols of calcium chloride in an aqueous solution and adding about 2 mols of aqueous caustic soda solution to render the mixture about neutral, separating off the complex compound formed by the addition of methyl alcohol, separating off the precipitate while washing with about 80-90% methyl alcohol and drying the precipitate in the air.

6. As new products compounds the composition of which corresponds to the probable formula:—

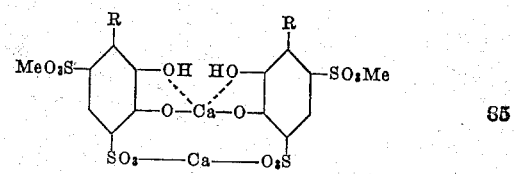

wherein R stands for a substituent of the group consisting of hydrogen and hydroxyl and Me stands for an alkali metal, said products being whitish powders, soluble in water with about neutral reaction, displaying a therapeutic action.

7. As new products compounds the composition of which corresponds to the probable formula:—

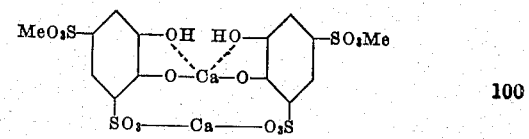

wherein Me stands for an alkali metal, said products being whitish powders, soluble in water with about neutral reaction, displaying a therapeutic action.

8. As a new product a compound the composition of which corresponds to the probable formula:—

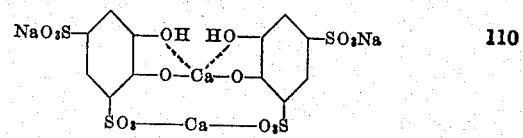

said product being a whitish powder, containing after drying in the air about 15% of water, about 10% of calcium and about 5.5% of sodium, being readily soluble in water with neutral reaction, the 12% aqueous solution of which being about isotonic to tissue, displaying a therapeutic action.

In testimony whereof, I affix my signature.

HANS SCHMIDT.